United States Patent
Wolf et al.

(10) Patent No.: US 11,265,284 B2
(45) Date of Patent: Mar. 1, 2022

(54) COMMUNICATION STATUS SYSTEM AND METHOD

(71) Applicant: Westinghouse Air Brake Technologies Corporation, Wilmerding, PA (US)

(72) Inventors: Charles L. Wolf, Olney, MD (US); Paul Gerard Bender, Clarksburg, MD (US); Richard S. Klemanski, Walkersville, MD (US)

(73) Assignee: Westinghouse Air Brake Technologies Corporation, Wilmerding, PA (US)

( * ) Notice: Subject to any disclaimer, the term of this patent is extended or adjusted under 35 U.S.C. 154(b) by 0 days.

(21) Appl. No.: 16/577,964

(22) Filed: Sep. 20, 2019

(65) Prior Publication Data

US 2020/0084176 A1    Mar. 12, 2020

Related U.S. Application Data

(63) Continuation-in-part of application No. 15/481,817, filed on Apr. 7, 2017, now Pat. No. 10,479,382, and a continuation-in-part of application No. 15/073,929, filed on Mar. 18, 2016, now Pat. No. 10,530,676.

(51) Int. Cl.
| | |
|---|---|
| *G06F 15/173* | (2006.01) |
| *H04L 51/58* | (2022.01) |
| *H04L 51/00* | (2022.01) |
| *G08G 1/16* | (2006.01) |

(Continued)

(52) U.S. Cl.
CPC .............. *H04L 51/38* (2013.01); *B61C 17/12* (2013.01); *B61L 15/0027* (2013.01); *B61L 15/0036* (2013.01); *G08G 1/163* (2013.01); *H04L 51/14* (2013.01)

(58) Field of Classification Search
CPC ......... H04L 51/38; H04L 51/14; H04L 51/34; G08G 1/163; G08G 1/22; B61C 17/12; B61L 15/0036; B61L 15/0027
USPC ...... 709/224, 218; 701/1, 2, 19, 22, 117, 36, 701/49; 340/636.1; 370/252, 338
See application file for complete search history.

(56) References Cited

U.S. PATENT DOCUMENTS

| | | |
|---|---|---|
| 5,720,455 A | 2/1998 | Kul et al. |
| 6,434,452 B1 | 8/2002 | Gray |
| 7,715,956 B2 | 5/2010 | Bryant |

(Continued)

OTHER PUBLICATIONS

First Examination Report for corresponding AU Application No. 2016397695 dated Feb. 3, 2021 (4 pages).

(Continued)

*Primary Examiner* — Thuong Nguyen
(74) *Attorney, Agent, or Firm* — The Small Patent Law Group LLC; Christopher R. Carroll

(57) ABSTRACT

Embodiments of the invention relate to a communication system for vehicles and an associated method. A method includes receiving a command message from a first vehicle at a second vehicle, wherein the first vehicle and second vehicle are communicatively coupled to define at least a portion of a vehicle group; receiving a status reply message from the second vehicle at the first vehicle in response to a trigger event; controlling an operation of one or more vehicles in the vehicle group based at least in part on a determined communications status of a communication network comprising at least one communication device with respect to the command message and the status reply message.

18 Claims, 4 Drawing Sheets

(51) Int. Cl.
*B61C 17/12* (2006.01)
*B61L 15/00* (2006.01)

(56) References Cited

U.S. PATENT DOCUMENTS

| | | | |
|---|---|---|---|
| 8,190,315 B2 | 5/2012 | Kraeling et al. | |
| 8,249,763 B2 | 8/2012 | Brooks et al. | |
| 8,280,566 B2 | 10/2012 | Foy et al. | |
| 8,328,144 B2 | 12/2012 | Smith | |
| 8,428,798 B2 | 4/2013 | Kull | |
| 8,568,239 B2* | 10/2013 | Takayama | H04L 67/38 463/42 |
| 10,212,150 B2* | 2/2019 | Zafiroglu | G06Q 10/06 |
| 10,479,382 B2* | 11/2019 | Bender | B61L 15/0027 |
| 10,530,676 B2* | 1/2020 | Wolf | B61L 3/008 |
| 2001/0018636 A1* | 8/2001 | Mizuno | G01C 21/26 701/518 |
| 2002/0091883 A1* | 7/2002 | Beardsley | G06F 13/122 710/18 |
| 2003/0094546 A1 | 5/2003 | Kellner et al. | |
| 2003/0125852 A1 | 7/2003 | Schade et al. | |
| 2003/0182029 A1 | 8/2003 | Horst et al. | |
| 2004/0258239 A1* | 12/2004 | Gallant | H04L 29/06 370/401 |
| 2005/0203673 A1* | 9/2005 | El-Hajj | G06Q 10/08 701/1 |
| 2006/0015231 A1* | 1/2006 | Yoshimura | B60W 30/00 701/48 |
| 2006/0085103 A1* | 4/2006 | Smith | H04B 7/0888 701/19 |
| 2006/0186996 A1* | 8/2006 | Sato | B60R 25/24 340/10.2 |
| 2006/0198305 A1* | 9/2006 | Hamdi | H04L 41/12 370/232 |
| 2007/0001869 A1* | 1/2007 | Hunzinger | H04L 12/1854 340/903 |
| 2007/0233335 A1* | 10/2007 | Kumar | B61L 25/026 701/22 |
| 2007/0236079 A1 | 10/2007 | Kull | |
| 2008/0204262 A1* | 8/2008 | Shimizu | G08B 25/016 340/636.1 |
| 2009/0223760 A1 | 9/2009 | Smith | |
| 2009/0248226 A1 | 10/2009 | Kellner et al. | |
| 2010/0049384 A1 | 2/2010 | Kraeling et al. | |
| 2010/0094489 A1 | 4/2010 | Moffit et al. | |
| 2010/0130124 A1 | 5/2010 | Teeter et al. | |
| 2010/0235017 A1* | 9/2010 | Peltonen | B61L 15/0018 701/2 |
| 2010/0235022 A1* | 9/2010 | Siddappa | B61L 3/006 701/20 |
| 2012/0290156 A1 | 11/2012 | Woo et al. | |
| 2013/0197719 A1* | 8/2013 | Nagasawa | G05D 1/0027 701/2 |
| 2014/0052315 A1 | 2/2014 | Isailovski et al. | |
| 2014/0074327 A1 | 3/2014 | Weber | |
| 2014/0078926 A1* | 3/2014 | Nishioka | H04L 1/1883 370/252 |
| 2014/0121953 A1* | 5/2014 | Kraeling | G08G 1/22 701/117 |
| 2014/0200014 A1* | 7/2014 | Iwai | H04W 76/40 455/450 |
| 2015/0210168 A1 | 7/2015 | Pykkonen et al. | |
| 2015/0210232 A1* | 7/2015 | Kanzaki | H02H 7/18 701/36 |
| 2015/0271137 A1* | 9/2015 | Seok | H04L 63/123 370/338 |
| 2016/0339929 A1* | 11/2016 | Schoenly | B61L 3/006 |
| 2017/0106888 A1 | 4/2017 | Shubs, Jr. et al. | |
| 2017/0129513 A1* | 5/2017 | Seaton | B61L 27/04 |
| 2018/0276986 A1* | 9/2018 | Delp | G08G 1/005 |
| 2018/0295110 A1* | 10/2018 | Chen | H04L 63/0442 |
| 2018/0376290 A1* | 12/2018 | Dhillon | H04W 4/023 |
| 2019/0025820 A1* | 1/2019 | Ferguson | G08G 1/0175 |
| 2019/0031237 A1* | 1/2019 | Wang | B62D 1/28 |
| 2020/0084176 A1* | 3/2020 | Wolf | H04L 51/34 |
| 2020/0229039 A1* | 7/2020 | Cao | H04W 28/10 |

OTHER PUBLICATIONS

Preliminary Office Action published in the Electronic Official Gazette No. 2588, dated Aug. 11, 2020. for corresponding Brazilian Patent Application BR 11 2018 068789-8.

First Examination Report for corresponding AU Application No. 2018250112 dated Jun. 15, 2020.

* cited by examiner

Lead Command Message

COMMUNICATION STATUS SYSTEM AND METHOD

CROSS REFERENCE TO RELATED APPLICATIONS

This application is a Continuation-In-Part application claiming priority to U.S. patent application Ser. No. 15/073,929 filed Mar. 18, 2016; and this application is a Continuation-In-Part application claiming priority to U.S. patent application Ser. No. 15/481,817 filed Apr. 7, 2017. The entire contents of which are hereby incorporated by reference.

BACKGROUND

Technical Field

Embodiments of the invention relate to a communication system for vehicles and an associated method.

Discussion of Art

Communication among mobile assets may be useful to ensure the coordination of various functions of the mobile assets. With regard to vehicles, such functions may include throttle control, braking, and direction. These may help to coordinate during operation. Radio frequency schemes may be used communication, with various combinations of communication devices and arrangements, e.g., transmitters, receivers, transceivers, and/or the like, distributed among the vehicles.

Upon receipt of the command message, a vehicle may transmit a reply message. The message may include actual status information, particularly as pertaining to the command message instructions. The absence or presence of a reply does not necessarily mean that vehicles are not following the command message instruction.

In one example, a vehicle in a vehicle group may traverse a wide range of topographies including mountainous terrain and other areas having physical features, such as tunnels, that may cause a temporary loss of communication. When traveling through such areas, an operator may interpret the lack of a status reply message from another vehicle to mean a proper command message information was not received or understood. However, it may be the case that the reply message was not received because it was lost due to a temporary communication failure. In this respect, the remote vehicle may be following the command message instructions despite an erroneous conclusion that the remote vehicle is not following the command message instructions. It may be desirable to have a system and method that differs from those that are currently available.

BRIEF SUMMARY

According to one embodiment, a system is provided that includes a first controller that can receive a command message from a first vehicle at a second vehicle, wherein the first vehicle and second vehicle are communicatively coupled to define at least a portion of a vehicle group; a second controller that can receive a status reply message from the second vehicle at the first vehicle in response to a trigger event, and at least one of the first and second controllers that can operate one or more vehicles in the vehicle group based at least in part on a determined communications status of a communication network comprising at least one communication device with respect to the command message and the status reply message.

In one embodiment, a method is provided that includes receiving a command message from a first vehicle at a second vehicle, wherein the first vehicle and second vehicle are communicatively coupled to define at least a portion of a vehicle group; receiving a status reply message from the second vehicle at the first vehicle in response to a trigger event; controlling an operation of one or more vehicles in the vehicle group based at least in part on a determined communications status of a communication network comprising at least one communication device with respect to the command message and the status reply message.

According to one aspect or embodiment, a method is provided that includes transmitting, by a lead communication device of a lead vehicle, a command message; receiving, by a plurality of communication devices of a respective plurality of remote vehicles, the command message; transmitting, by a communication device of at least one remote vehicle of the plurality of remote vehicles, a status reply message in response to receipt of the command message, wherein at least a portion of the command message is repeated within the status reply message; receiving, by a communication device of at least one other remote vehicle of the plurality of remote vehicles, the status reply message including the repeated at least a portion of the command message; incrementing, at the at least one other remote vehicle of the plurality of remote vehicles, a current status reply count in response to the receipt of the status reply message including the repeated at least a portion of the command message from the at least one remote vehicle of the plurality of remote vehicles; and transmitting, by the communication device of the at least one other remote vehicle of the plurality of remote vehicles, an expanded status reply message including the current status reply count to the lead communication device of the lead vehicle; receiving, by the lead communication device of the lead vehicle, the expanded status reply message; determining, by an on-board processor of the lead vehicle, a communications status of a communication device of the at least one remote vehicle with respect to the command message, based at least partly on the current status reply count in the expanded status reply message received from the at least one other remote vehicle; and controlling, by the on-board processor of the lead vehicle, at least one of a throttle and a brake of the vehicle group based on the determined communications status of the communication device of the at least one remote vehicle with respect to the command message.

BRIEF DESCRIPTION OF THE DRAWINGS

Further features and aspects of the invention are disclosed in the following detailed description made with reference to the drawings in which.

DETAILED DESCRIPTION

Figure 1:
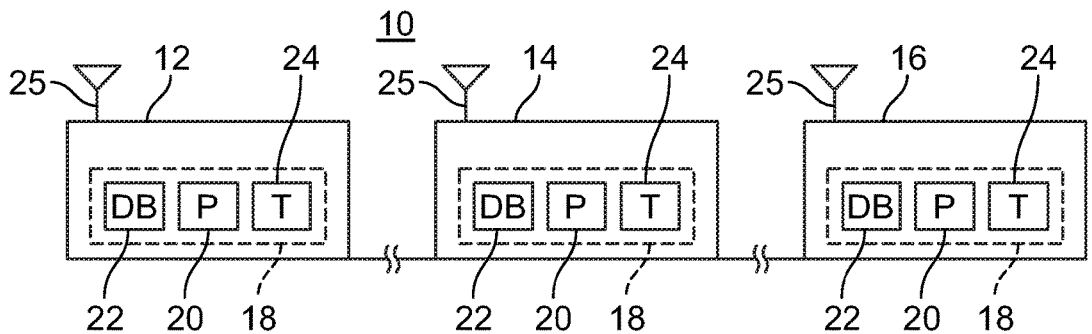
FIG. 1 is a schematic diagram of a portion of a vehicle group according to an aspect of the invention.

Embodiments of the invention relate to a communication system for vehicles and an associated method. In one embodiment, a method is provided that includes receiving a command message from a first vehicle at a second vehicle, wherein the first vehicle and second vehicle are communicatively coupled to define at least a portion of a vehicle group; receiving a status reply message from the second vehicle at the first vehicle in response to a trigger event; controlling an operation of one or more vehicles in the vehicle group based at least in part on a determined communications status of a communication network comprising at least one communication device with respect to the command message and the status reply message.

At least a portion of the command message may be repeated within the status reply message. The status reply message may include a command received count that represents a number of times that the status reply message has been received from at least one vehicle in the vehicle group. A controller may determine a communications status of the communication device based at least partly on the command received count. The message source indicator may include a semaphore.

In one embodiment, a status reply message may be modified to create an expanded status reply. In an expanded status reply a first status reply and a second status reply may be included. Each of the first and second status replies may be with respect to different vehicles in the vehicle group. The communication status of the communication network may be determined. The communication status may be referred to as the communication network heath.

The communication device may be at least a first communication device of a plurality of communication devices and the first communication device may be disposed on the first vehicle. The determination may be based at least partly on a number or count of status reply messages received by the first communication device of the first vehicle.

The second vehicle may be one of a plurality of remote vehicles, all of which (remote and lead vehicles) may be members of the vehicle group. The method may include confirming or logging receipt of the command message by one or more of the remote vehicles based at least in part on a respective status reply message from the one or more of the remote vehicles. The controller may use the command message to control at least one of a throttle, brake, steering, yaw, and elevation of one or more vehicles in the vehicle group at least partly in response to the confirmed or logged receipt of the command message. The operational characteristics that may be controlled may depend on application specific parameters, such as the type of vehicle being controller. Suitable vehicle types may include automobiles, OTR trucks, marine vessels, locomotives, mining and construction equipment, and aircraft. In one embodiment, the vehicles are aerial drones. In one embodiment, the vehicles are locomotives. In one embodiment, the vehicles are of different types relative to each other In one embodiment, an on-board controller of the first vehicle may control at least one of a throttle, brake, steering, yaw, and elevation of at least one other vehicle in the vehicle group. The other vehicle may, in one embodiment, voluntarily allow the first vehicle to control or if being controlled may take back control. Once in control, the controller (remotely located from the controlled vehicle) may perform actions in a less restrictive manner in response to a determination that a confirmed receipt of the command message by at least one other vehicle of the vehicle group relative to a determination that one or more of the at least one other vehicle has not received the command message. For example, a low quality of service communication network may induce an operational state of the vehicle group that provides extra distance between vehicles, slows down vehicle speeds, provides extra slack in groupings, takes corners wider, and the like.

In a situation where the communication device is a first communication device of a plurality of communication devices, the method may include determining that the first communication device has not received a respective status reply message from a second communication device of the plurality of communication devices that is associated with at least one second vehicle; and determining a communications status of the second communication device based at least partly on the current status reply count in an expanded status reply message.

In one embodiment, the method may include delaying, for a determined period of time, designation of the communication status of the second communication device. In this manner, a false designation of communication failure is not determined. Further, if a vehicle's communication system is out of communication for a determined time it may begin to attempt communication with regard at least to its status to other communication devices. Upon successful contact, the designation of the temporarily unavailable communication device may be reset to a functioning and available communication device. The status reply message may be generated periodically without prompting from receipt of a command message. Further, it may be determined whether the at least one communication device of a second vehicle has received the command message; and the command message may be transmitted from the first vehicle until a controller determines that the communication device of the second vehicle has received the command message.

In one embodiment, the inventive system may switch modes of the first vehicle and the second vehicle such that the second vehicle transmits the command message and the first vehicle receives the command message from the second vehicle, and the first vehicle responds to receipt of the command message by generating and transmitting a status reply message to the second vehicle. This may occur if the first or lead vehicle has the communication device that is unavailable. Another communication device may take the responsibility and the corresponding second controller may then begin to control the movement and operation of the vehicle group.

The on-board controller or processor of the first vehicle may determine whether at least one of two or more communication devices of a respective two or more remote second vehicles has not received the command message; and may generate or provide, by the on-board processor of the lead vehicle, an output to an operator of the first vehicle indicating at least one of the following: i) receipt of the command message by each of the two or more communication devices of the respective two or more remote second vehicles is confirmed and ii) receipt of the command message by one or more of the two or more remote second communication devices of a respective two or more remote second vehicles cannot be confirmed.

A controller may determine whether the received command message is a new command message or a previously received command message. The controller may determine a location of at least one second vehicle and of the first vehicle based at least in part on the current status reply count.

In one embodiment, a system is provided that includes a first controller that can receive a command message from a first vehicle at a second vehicle, wherein the first vehicle and second vehicle are communicatively coupled to define at least a portion of a vehicle group; a second controller that can receive a status reply message from the second vehicle at the first vehicle in response to a trigger event, and at least one of the first and second controllers that can operate one or more vehicles in the vehicle group based at least in part on a determined communications status of a communication network comprising at least one communication device with respect to the command message and the status reply message.

FIG. 1 is a schematic diagram of a portion of a vehicle group 10. By way of example, the vehicle group 10 may include a command vehicle 12, a first remote vehicle 14, and a second remote vehicle 16. In the illustrated embodiment the vehicles are shown as locomotives. In the illustrated embodiment, a plurality of railcars, not shown, may be situated between the locomotives. In other embodiments, suitable other vehicles may include automobiles, over-the-road (OTR) trucks, mining equipment, construction equipment, marine vessels, and aircraft. The number of remote vehicles may be selected based on application specific parameters. The command vehicle may be static (a single unchanging vehicle) or may be dynamic and may be different designated or determined vehicles. The change of command status from one vehicle to another may be in response to application specific parameters. Such parameters may include a fault or failure of communication equipment, the removal of the command vehicle from the vehicle group, and other like triggers. Each vehicle may include an on-board controller 18. Suitable on-board control systems may include one or more of an edge-based system, an on-board computer, a vehicle management computer, a computing system, a computing device, a controller, a processor, and/or the like). In one embodiment, the controller may include at least one on-board processor 20 (or processing unit) and at least one database 22, which processor may be programmed or configured to control and/or manage various systems or components on-board each vehicle and/or throughout the vehicle group. Each controller 18 may include, control, or be in communication with certain combinations of communication devices 24. Suitable communication devices may include one or more wireless communication devices, communication units, radio transmitters, receivers, and/or transceivers, programmed or configured for enabling wireless communication by and among the vehicles in the vehicle group. One or more antennae 25 may be provided for each vehicle to operate with the radio systems.

The processor 20 of the command vehicle 12 may be programmed or configured to function as the controlling processor (or vehicle management computer) of a distributed power communication scheme, such as one designed and implemented by the assignee of the present invention, Wabtec Corporation, and/or as described in U.S. Pat. No. 5,720,455, the entire contents of which are hereby incorporated by reference. The lead vehicle processor 20 may be configured for, among other things, transmitting command instructions within a command message to the remote vehicles 14 and 16. A command message may include command instructions to be executed, implemented, or acted upon by the remote vehicles accordance or compliance with the distributed power communication scheme. Command instructions may include direct or indirect commands, direction commands, traction commands, dynamic braking commands, air brake commands, and/or any other commands relating to electrical and/or pneumatic functions of the vehicle group 10. For example, the command instruction may be a control instruction that the command vehicle transmits to at least one of the remote vehicles.

The command vehicle may transmit to all or some of the remote vehicles periodically. Different vehicles may need different rates of periodicity. Further, different operating modes of the vehicles and different environmental factors affecting the vehicles may need different rates of periodicity. Suitable periodicity may be selected based on application specific parameters. In one embodiment, the periodicity may be in a range of from about 10 seconds to about 30 seconds if there are no command changes. At other times the command system may be in a receive mode, i.e., listening for messages from the remote vehicles. If a command change is determined, the command vehicle may transmit the associated command change instructions substantially immediately within the limits of the protocol of the distributed power communication scheme. In one embodiment, a minimum time between transmissions may be in a range of from about 1 second to about 3 seconds, and in another embodiment or aspect, once every 4-6 seconds, and in a still further embodiment or aspect, once every 8-10 seconds. For example, during complex maneuvering in a complex environment at greater speeds the sampling rate may increase relative to a lower complexity, lower speed traversal of a simpler environment.

When the command vehicle transmits a command message, the command vehicle may expect a status reply message from each remote vehicle of the vehicle group indicative of the actual functional status or condition of the respective remote vehicle. If a status reply message is not received directly from all remote vehicles, or if the command vehicle cannot otherwise determine the status of a remote vehicle, the command vehicle may re-transmit the command message. If the status or condition of a remote vehicle is not determined in response to or based on the re-transmitted command message, the command vehicle may continue to transmit the command message periodically until the functional status of all of the remote vehicles is determined.

The remote vehicle controller(s) may receive command messages from the command vehicle. The remote vehicle controller(s) may transmit a respective remote status reply message in response to a trigger event. The receipt of a command message is a suitable trigger event while other trigger events may include the elapse of a determined time or a change in the operational state of a vehicle. For example in one embodiment the remote vehicle controller generates a status reply message without prompting from the command vehicle. The status reply message may contain status data. Suitable status data may be indicative of the respective transmitting remote vehicle's actual operational status or condition. Other suitable status data may relate to the remote vehicle's correspondence, alignment, or conformance with instructions contained in the command message. Yet other suitable status data may include operating status, such as the speed, direction, orientation, of the remote vehicle or other objects or vehicles proximate to the remote vehicle (e.g., distance to a known stationary object). In one example, the status reply message of the remote vehicle may include data indicative of that respective remote vehicle's actual status related to at least one of the following: configurable settings, throttle settings, speed, direction, braking information, and/ or air brake pressure information. Upon receipt of the status reply message by the command vehicle, this information is used by the command vehicle to determine whether the respective remote vehicle is following the appropriate command instructions in the command message. A remote vehicle's status reply message may also include data indicative of, associated with, or related to additional status or condition information of the respective remote vehicle. In one example, this additional information may relate to the traction motor current and/or main reservoir pressure. In another example, this additional information may relate to a fueling level, or a state-of-charge for energy storage. Other vehicle health information may be included.

To ensure that remote vehicles receive a command message the controllers of the remote vehicle may be programmed or configured to repeat all or a portion of the command message within a respective remote vehicle's status reply message. Accordingly, if a remote vehicle, or any other remote vehicles within the vehicle group 10, cannot receive the command message directly from the command vehicle, then that remote vehicle may instead receive the command message as part of another remote vehicle's status reply message (and act on or implement the repeated command message accordingly). This condition may occur when a remote vehicle is out of radio range with the command vehicle.

Remote vehicles within the vehicle group may transmit their respective reply messages within sequential time slots that may be determined by a determined communications scheme. For example, after receiving a command message directly from the command vehicle, the first remote vehicle may transmit a status reply message in a first time slot, while the second remote vehicle may transmit its status reply message in a second time slot. Each respective status reply message may include a repeat of the command message. If a remote vehicle receives the command message from another remote vehicle's status reply message (instead of directly from the command vehicle), then that remote vehicle may transmit its respective status reply message after other remote vehicles have transmitted their respective status reply messages.

Figure 2:
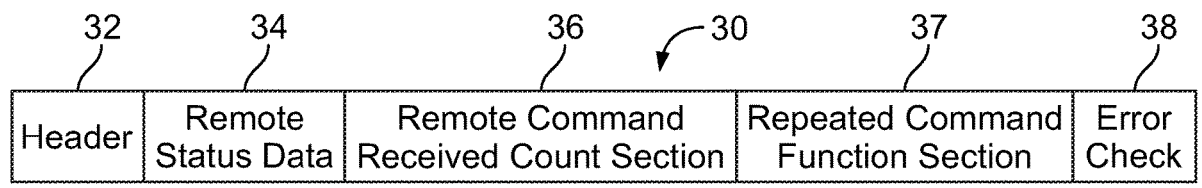
FIG. 2 is an example diagrammatic representation of a message structure including data indicative of a count.

FIG. 2 illustrates a diagrammatic representation of an example data structure of a remote status reply message 30, which includes a header portion 32, a remote status data portion 34, a remote command received count section 36, a repeated command function section or block 37, and an error check portion 38. The remote status data portion 34 may include data indicative of the respective vehicle's actual status, such as with respect to the commands received in a lead command message 40 (as discussed hereinafter). The remote command received count section may include one or more bits whose value can be incremented in response to or based on receipt of a status reply message from another remote vehicle.

For example, a vehicle group with only two remote vehicles would require only a single bit remote "command received" count section. In one embodiment, a vehicle group with two, three, or four or more remote vehicles may use a multi-bit remote "command received" count section. The bits within the remote "command received" count section may not individually indicate that a respective remote vehicle has received the command message and/or is following the command instructions in the command message. That is, the "command received" count section may not require setting a respective bit for each remote vehicle. Instead, the "command received" count section represents a number of times that a status reply message has been received from another remote vehicle, without indicating the particular vehicles from which the status replies have been received. However, by using another data field the specific remote vehicle(s) from which the remote vehicle receives the status reply message may be identified. Identification may be through an identifier of the remote vehicle that transmits the status reply message. In one embodiment, the repeated command function section includes the command message or a portion of the command message.

The remote vehicle receiving a status reply message from another remote vehicle need not compare the received status reply message to a stored command message 40 to determine whether another remote vehicle has received the command message, and/or is following the set of command instructions. Instead, the receipt of the status reply message, itself, is sufficient to cause the receiving remote vehicle to increment its count. Accordingly, extra processing at the remote vehicle is avoided.

Figure 3:
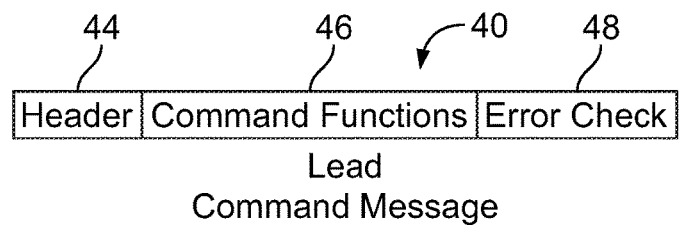
FIG. 3 illustrates example diagrammatic representations of a command message.

FIG. 3 illustrates an example structure of a lead command message. The lead command message may include a header portion 44, a command functions portion 46, and an error check portion 48. The command functions portion 46 may include data indicative of the control instructions broadcast or transmitted by the command vehicle to the remote vehicles. The specific structures of the messages depicted in FIGS. 2 and 3 may differ and still accomplish the same result.

Figure 4:
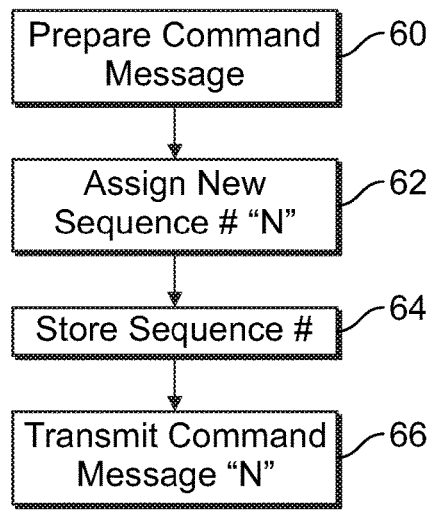
FIG. 4 is a flow chart showing a system and process for transmitting a command message.

FIG. 4 is a flow chart showing a system and process for transmitting a lead command message according to a preferred and non-limiting embodiment or aspect. In step 60, the command vehicle prepares a command message "N" that may have a lead command message structure 40. A new sequence number "N" may be assigned to the command message in step 62. The sequence number "N" may be stored in the database 22 of the command vehicle. Data indicative of the content of the associated command message, e.g., command message "N", may be stored in database 22, by the command vehicle, in step 64. The command message may be generated or prepared using the on-board controller 18 (or on-board processor 20) of the command vehicle in conjunction with the distributed power communication scheme of the vehicle group. The command vehicle transmits or broadcasts the command message "N" in step 66.

Figure 5:
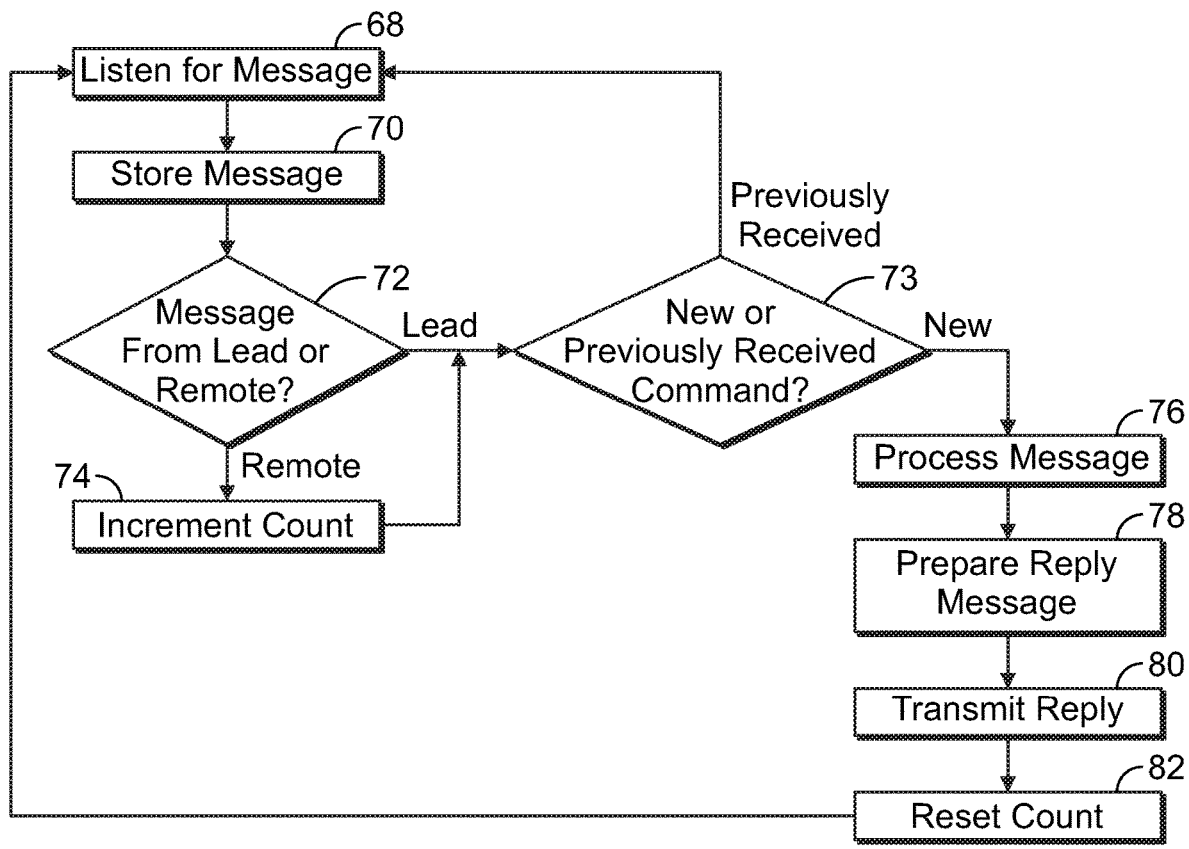
FIG. 5 is a flow chart showing a system and process for receiving a message at a remote unit.

FIG. 5 is a flow chart showing a system and process for receiving a message at a remote vehicle according to a preferred and non-limiting embodiment or aspect. In one exemplary aspect, a remote vehicle waits to receive a message at step 68. For example, the command message "N" may be received directly by one or more remote vehicles in step 68. Instead of being received directly from the command vehicle, step 68 also allows for one or more remote vehicles to receive the command message "N" by virtue of the command message "N" being repeated in the status reply message of another remote vehicle, e.g., in the repeated command function section or block 37. The remote vehicle may store data indicative of the content of the received command message (or 37), including the sequence number "N" of the command section or block, in its onboard database 22, in step 70.

In step 72, the remote vehicle determines whether the received message is (i) a lead command message received directly from the command vehicle or (ii) another remote vehicle's status reply message that is "repeating" a lead command message, e.g., in the repeated command function section 37. For example, the received message may indicate the vehicle from which it was directly sent, and the remote vehicle may check the received message to determine the vehicle from which the received message was directly sent. If the received message is another remote vehicle's status reply message that is "repeating" a lead command message, i.e., scenario (ii), the remote vehicle increments its current count in step 74. After incrementing the count in step 74, processing proceeds to step 73 in which the remote vehicle determines whether the received message contains a new lead command or if it contains a command that has previously been received. If the received message is a lead command message received directly from the command vehicle in step 72, i.e., scenario (i), processing can proceed directly to step 73 in which the remote vehicle determines whether the received message contains a new lead command or if it contains a command that has previously been received. For example, the remote vehicle may check the sequence number "N" of the command function section or block in the received message against the last stored sequence number in its on-board database 22 to determine whether the received message contains a new lead command or a command that has been previously received. This test can be performed on all messages received by the remote vehicle, regardless of whether the message came from a command vehicle directly or was received from another remote vehicle. If the remote vehicle determines in step 73 that the received message includes a command that has been previously received, processing can return to step 68 in which the remote vehicle listens for further command messages 40 and status reply messages 30 broadcast by the command vehicle and other remote vehicles.

If, in step 73, the remote vehicle determines that the received message includes a new command message, processing proceeds to step 76. The remote vehicle processes the associated command instructions included in the command message "N" so that the remote vehicle is set in the proper state of operation in step 76. In step 78, the remote vehicle prepares a status reply message, which may contain data indicative of the actual status of remote vehicle pertaining to command message "N" and the current count of the remote vehicle. The current count may be indicated by the field or section in the message. In step 80, the remote vehicle transmits the status reply message to the command vehicle. Step 80, therefore, allows for a remote vehicle to transmit back to the command vehicle in response to or based on its receipt and processing of a command message.

A noted elsewhere herein, the current count can be stored by memory or an event recorder of the remote vehicle, by memory or an event recorder of the command vehicle, or by the combination thereof. The remote vehicle and/or the command vehicle can analyze the count data for radio management purposes and to determine problem areas. Problem areas may include one or more of communication errors, transmittal issues, corruption issues, and the like, in the communications network. For example, a remote vehicle that repeatedly loses communication with the lead vehicle, e.g., a number of communications losses for a period of time between the remote and lead vehicles exceeds a threshold, can indicate the presence of a problem in the communications network. In another example, a location of the remote vehicle and the command vehicle during a time period in which the current count was determined can be associated with the current count to determine areas in the track network where communication between the vehicles of the vehicle group has been diminished, lost or failed. Location data for one or more vehicles of the vehicle group may be determined from a Positive Train Control (PTC) system, a vehicle control system, a location based device or tracking system, a route or travel plan indicating where a vehicle should be at a given time, notifications from wayside devices capable of recognizing the presence of a vehicle group, and a transmission/reception time of the message including the current count indicated by the field or section. In some implementations, the count data can be used to determine a need for radio repeaters or other communications mitigation between specific vehicles in the vehicle group and/or at specific locations in the track network.

After transmitting the status reply message in step 80, the remote vehicle may reset its current count to zero at step 82, and processing may return to step 68 for the remote vehicle to listen for further command messages 40 broadcast by the command vehicle and/or status reply messages from the other remote vehicles.

Figure 6:
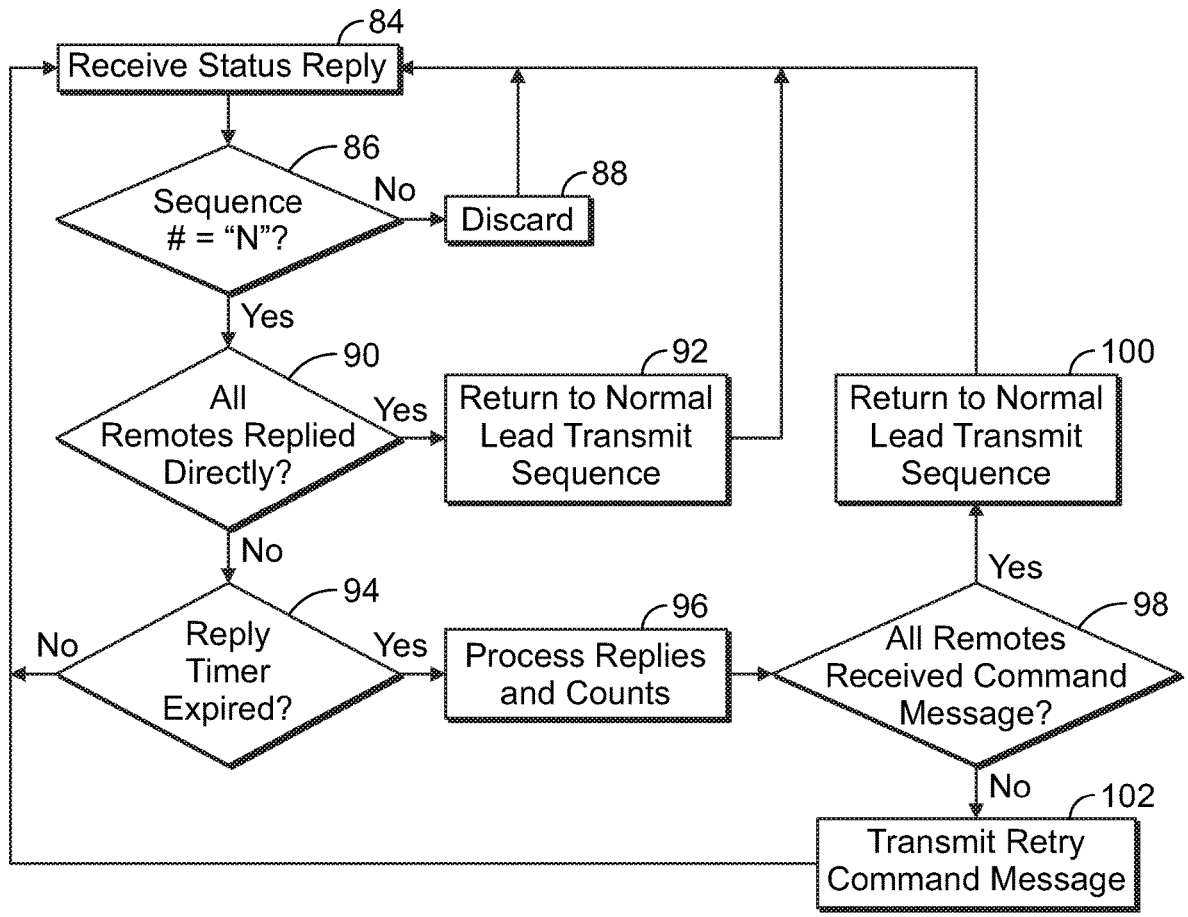
FIG. 6 is a flow chart showing a system and process for receiving remote status messages by a vehicle.

FIG. 6 is a flow chart showing a system and process for receiving remote status reply messages by a command vehicle. In step 84, the command vehicle may receive a remote vehicle's status reply message. The on-board processor 20 of the command vehicle may determine, in step 86, whether the sequence number of the command section or block in the received message equals the sequence number "N" for a current command message stored on-board the command vehicle. If the sequence numbers are not equal, the command vehicle may discard the received message in step 88, and processing returns to step 84 for the command vehicle to listen for further status reply messages.

If the sequence numbers match, the command vehicle controller may determine, in step 90, whether all remote vehicles within the vehicle group have now replied directly to the command vehicle with their respective command functions status. For example, the controller of the command vehicle may determine if all the remote vehicles within the vehicle group have now replied directly to the command vehicle with their respective command function status within a first reply period. the lead vehicle may determine if all of the remote vehicles within the vehicle group have now replied directly to the command vehicle based on a number of status reply messages received by the lead communication device of the lead vehicle and/or a number of remote vehicles or a number of status reply messages expected to be received. If all the remote vehicles within the vehicle group have replied directly to the command vehicle, the command vehicle returns the communication device 24, in step 92, to its normal lead transmit sequence, which may be defined by the protocol of the distributed power communications scheme operable among the vehicles within the vehicle group. In some implementations, the command vehicle provides an output to an operator of the command vehicle, e.g., via a driver display screen, a visual display unit, in the form of an audible alert, and/or the like, that receipt of a most recent command message by all remote vehicles is confirmed, or that receipt of the most recent command message by one or more of the remote vehicles cannot be confirmed.

If all remote vehicles have not replied directly to the command vehicle in step 86, the controller of the command vehicle determines, in step 94, whether a reply timer has expired. The reply timer may be established as part of the distributed power communications scheme. If the reply timer has not expired, then the command vehicle may return to step 84, wherein the communication device 24 of the command vehicle continues listening for status reply messages. If the reply timer has expired, the controller of the command vehicle checks and processes, in step 96, the "command received" count section contained in each status reply message, to determine whether the command vehicle has received the status reply message directly from each respective remote vehicle in the vehicle group.

Each received status reply message, and each received "command received" count section of each received status reply message, are processed in step 96 by the controller of the command vehicle to determine which of the remote vehicles have received the command message, either directly or indirectly. Each status reply message including the section may be decoded by a respective controller (of the on-board controller 18) of the command vehicle to determine whether the remote vehicles have received the command message and/or are following the command message instructions.

After processing each received status reply message and each received "command received" count section of each received status reply message, the controller of the command vehicle, in step 98, determines whether all remote vehicles within the vehicle group have received the command message and/or are following the instructions contained within the command message. If it is determined that all remote vehicles have received the command message, the command vehicle returns the communication device 24 to its normal lead transmit sequence in step 100, which may be defined in the protocol of the distributed power communications scheme.

A remote vehicle may be considered to have received the command message if the command vehicle receives a status reply message directly from that remote vehicle, or if processing of the received status reply messages and the "command received" count section of each received status reply message at the command vehicle, determines that each remote vehicle received and/or processed the command message. If the controller of the command vehicle determines that that all remote vehicles within the vehicle group have received the command message and/or are following the instructions contained within the command message, the command vehicle may lessen the severity of its response to a one-way communication loss with a remote vehicle to a level that is less than its current response to a two-way loss of communications. For example, the command vehicle may lessen the severity of its response by not generating extra radio message queries, employing longer delays before applying operating restrictions, showing a one-way communications loss indication on the crew display, adding entries to an internal log, and/or not stopping or slowing the vehicle group.

If the on-board processor of the command vehicle determines, in step 98, that one or more remote vehicles have not received the command message, the communication device of the command vehicle may transmit or broadcast a retry command message, re-transmits or re-broadcasts, or takes other restrictive measures to respond to the determined two-way communications loss, in step 102. A retry command message (or the command message) may be broadcast with minimal time delay, such as about once every 2-4 seconds, for example. A communication loss or interruption warning or alarm condition may be activated by the controller of the command vehicle if it does not receive a command functions status message (or portion) 46 regarding each remote vehicle within a predetermined period of time. This period may vary depending on the criticality of the command functions broadcast to the remote vehicles. All of the remote vehicles may be declared to be following the command instructions if all of the remote vehicles have received the command message.

In one embodiment, the instant communication status system and method can be effectively implemented for identifying a missed reply in a two-remote vehicle configuration, i.e., in a configuration with a lead vehicle and only two remote vehicles. Specifically, the count in a scenario with only two remote vehicles would indicate whether the responding remote vehicle received a status reply message from the other remote vehicle. The lead vehicle (e.g., in step 98) can effectively determine, based on the responding remote vehicle's status reply, whether all remote vehicles within the vehicle group have received the command message and/or are following the instructions contained within the command message.

Alternatively, in a scenario of a remote vehicle counting scheme according to a preferred and non-limiting embodiment or aspect where the vehicle group includes three or more remote vehicles, e.g., remote vehicle (A), remote vehicle (B), and remote vehicle (C), two of the three remote vehicle's status reply messages are not received by the lead vehicle, and the remote vehicle (A) only receives a response from one of the remote vehicles (B) or (C), the lead vehicle may not be able to determine which of the two or more remote vehicles (B) and (C) did not receive the lead vehicle command message in response to or based on a status reply message from remote unit (A) including a count of one (unless some other indication field is included in the status reply message, as discussed above). In particular, and in this embodiment or aspect with a specified status reply message, the on-board processor of the lead vehicle cannot determine which of the remote vehicles (B) or (C) is in a two-way communications loss, i.e., which remote vehicle did not receive the command message in the first place, and which of the remote vehicles (B) or (C) is in a one-way communications loss, i.e., which remote vehicle received the command message. However, the on-board processor of the lead vehicle is still able to determine that a two-way communications loss exists. In such a situation, the system and method may include, e.g., at step 98, a determination that all remote vehicles have not received the command message, and that the lead vehicle should transmit or broadcast a retry command message (or re-transmit or re-broadcast the command message), e.g., at step 100.

If the lead vehicle receives a status reply message from two of the three remote units e.g., remote vehicles (A) and (B), the lead vehicle may determine, by process of elimination, which of the three remote vehicles, i.e., remote vehicle (C) in this example, did not receive the lead command message. The lead vehicle may then use the count sections, e.g., field or section of the status reply message, from each of the remote vehicles (A) and (B) to determine whether the remote vehicle (C) received the lead command message, as long as the count of one of the remote vehicles (A) and (B) is at least two. However, it is envisioned that a scenario may arise where the count of each of the replying remote vehicles (A) and (B) is one, in which case the lead vehicle will be unable to determine whether the remote vehicle (C) received the lead command message. That is, remote vehicles (A) and (B) may have incremented each other's counts. In such a situation, the system and method may include, e.g., at step 98, a determination that all remote vehicles have not received the command message, and that the lead vehicle should transmit or broadcast a retry command message (or re-transmit or re-broadcast the command message), e.g., at step 100. Alternatively, if the lead vehicle receives a status reply message from only one of the three remote vehicles, e.g., remote vehicle (A), that includes a count of two, the on-board processor of the lead vehicle may determine that each of the other remote vehicles (B) and (C) have received the command message and, thus, are in only a one-way communications loss. Processing at the first, lead or command vehicle for a vehicle group having more than three remote units may have a particular remote vehicle sending the message, and its respective count, as discussed herein.

A lead communication device 24, e.g., a lead transceiver unit, of a command vehicle to function interoperably with a communication device, e.g., a transceiver unit, of a remote vehicle, to execute distributed power communication functions for implementing aspects of the present invention. The respective on-board controller may be programmed or configured to allow for the lead communication device to determine which (remote) communication devices from among a plurality of (remote) communication devices located at spaced locations along the vehicle group are in receipt of a command message and/or are executing instructions associated with command functions of the command message. One exemplary embodiment or aspect allows for the respective on-board control systems and/or the communication devices, to be programmed or configured, such that when the lead communication determines that a respective (remote) communication is in receipt of a command message that an associated remote vehicle is following the command functions of the command message.

The on-board control system of the lead vehicle, after receiving response messages from the remote vehicles, determines a communication status for the vehicle group. In one embodiment, the vehicle group is a train consist and in another embodiment the vehicle group is a drone swarm. The communication status may be, for example, representative of a group-wide quality of service. The on-board control system of the lead vehicle may generate a quality of service indication; alternatively the quality of service determination (and subsequent indication) may be generated by a handheld apparatus regardless of its location relative to any vehicles in the vehicle group or by a back office system in communication with any of the vehicles in the vehicle group or by a vehicle in the vehicle group that is not the lead vehicle or by a wayside device that is neither a vehicle or a part of the vehicle group. The indication may be in the form of a metric, chart, report, and/or the like, that is reported to a network or vehicle operator, a back office system, and/or other parties. The group-wide quality of service may be with respect to a quality of transmission, a quality of reception, the strength of transmission or reception, the frequency of dropped service over a determined period, the frequency of dropped service in a determined region, other factors that may affect quality of service (such as network volume, network lag/ping rates, hardware considerations, software considerations, protocol translation requirements, power consumption levels, and environmental factors), and/or combinations of two or more of the foregoing. Hardware and software considerations may include generational communication gaps, such as whether the wireless service is a 3G, 4G, 5G, etc. system, or whether the system requires the use of a GSM cellular system, a radio-based system, or a satellite comm system. In one embodiment, the controller of the lead vehicle may monitor the message source counter for each response message received and, based on the message source counters, determine a number of remote vehicles that received the command message from the lead vehicle. Additional information about the vehicles in the vehicle group and the communication network may be obtained.

Figure 7:
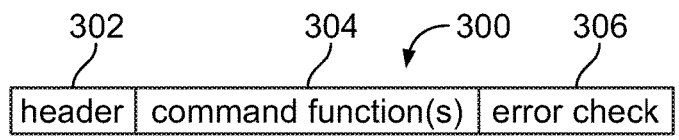
FIG. 7 is a data structure of a command message according to an embodiment.
Figure 8:
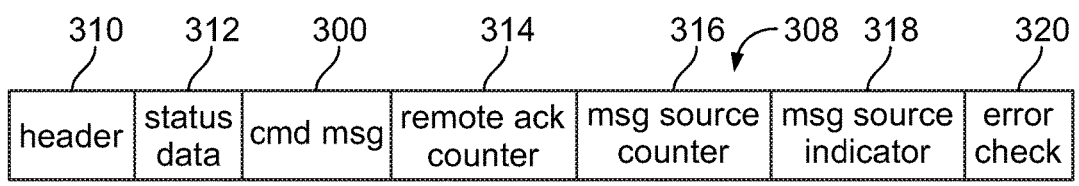
FIG. 8 is a data structure of a response message according to an embodiment.

FIGS. 7 and 8 illustrate, respectively, a command message 300 and a response message 308 according to an embodiment. The sections 302, 304, 306, 310, 312, 314, 316, 318, 320 of the messages 300 and 308 may be a determined number of bits, fixed or variable-sized fields in a data structure, and/or the like. The sections 302, 304, 306, 310, 312, 314, 316, 318, 320 may be alphanumeric strings, characters, integers, binary values, and/or another type of variable depending on application specific parameters. The command message 300 and response message 308 may be one or more objects in an object-oriented hierarchy, a plurality of smaller messages, or another type of data structure capable of specifying parameters and/or conveying information.

The command message 300 shown in the embodiment of FIG. 7 includes a header 302, a command function(s) section 304, and an error check section 306. It will be appreciated that various other sections may be included in the command message 300 and that the command message 300 may be structured in any number of other ways. The header 302 may include one or more identifiers that identify the source of the command message 300, such as a lead vehicle, as well as the remote vehicles that are to receive and act upon the command message 300. The header 302 may include a sequence number or other like variable to uniquely distinguish between different command messages. In some examples, the sequence number may be a separate field of the command message. The command function(s) section may include various commands for the remote vehicle to execute. Suitable commands may include one or more of distributed power operation command, direction change, operational mode changes, the start/stop of various equipment on-board a vehicle, and the like. In some examples, the command message may convey information to the remote vehicles and not necessary trigger an operational change. The error check section may be a checksum or any other like form of data to enable verification by a recipient vehicle that the message is intact and valid.

The response message 308 shown in the embodiment of FIG. 8 may include a header 310, a status data section 312, a command message 300, a remote acknowledgement count section 314, a message source count section 316, a message source indicator section 318, and an error check section 320. The header 310 may include one or more identifiers that identify the source of the response message, such as the remote vehicle that generates and transmits such a message. The status data section 312 may include data representative of one or more statuses of the remote vehicle and an acknowledgement of receipt, as examples. The command message 300 may be the command message received by the remote vehicle generating the response message 308 (or a portion thereof), either from the lead vehicle or from another response message 308 including the command message 300. The remote acknowledgement count section 314 may be a value of a programmatic counter that indicates a number of response messages received by other remote vehicles. The message source count section 316 may be a value of a programmatic counter that indicates a number of response messages received by other remote vehicles that, in turn, received a command message directly from the lead vehicle. The message source indicator section 318 may be a value of a semaphore, such as but not limited to a flag or other like variable, that indicates either a first state in which the remote vehicle generating the response message 308 received the command message directly from the lead vehicle, or a second state in which the remote vehicle generating the response message 308 did not receive the command message directly from the lead vehicle but, instead, received it from a response message transmitted by another remote vehicle. The value of the message source indicator section may represent a state or mode in any number of ways, such as "LEAD" and "REMOTE," a binary representation of true (1) or false (0), or may be non-binary data concerning the status and/or state of the remote vehicle.

In one embodiment, a method is provided that includes transmitting, by a lead communication device of a lead vehicle, a command message; receiving, by a plurality of communication devices of a respective plurality of remote vehicles, the command message; transmitting, by a communication device of at least one remote vehicle of the plurality of remote vehicles, a status reply message in response to receipt of the command message, wherein at least a portion of the command message is repeated within the status reply message; receiving, by a communication device of at least one other remote vehicle of the plurality of remote vehicles, the status reply message including the repeated at least a portion of the command message; incrementing, at the at least one other remote vehicle of the plurality of remote vehicles, a current status reply count in response to the receipt of the status reply message including the repeated at least a portion of the command message from the at least one remote vehicle of the plurality of remote vehicles; and transmitting, by the communication device of the at least one other remote vehicle of the plurality of remote vehicles, an expanded status reply message including the current status reply count to the lead communication device of the lead vehicle; receiving, by the lead communication device of the lead vehicle, the expanded status reply message; determining, by an on-board processor of the lead vehicle, a communications status of a communication device of the at least one remote vehicle with respect to the command message, based at least partly on the current status reply count in the expanded status reply message received from the at least one other remote vehicle; and controlling, by the on-board processor of the lead vehicle, at least one of a throttle and a brake of the vehicle group based on the determined communications status of the communication device of the at least one remote vehicle with respect to the command message.

Figure 9:
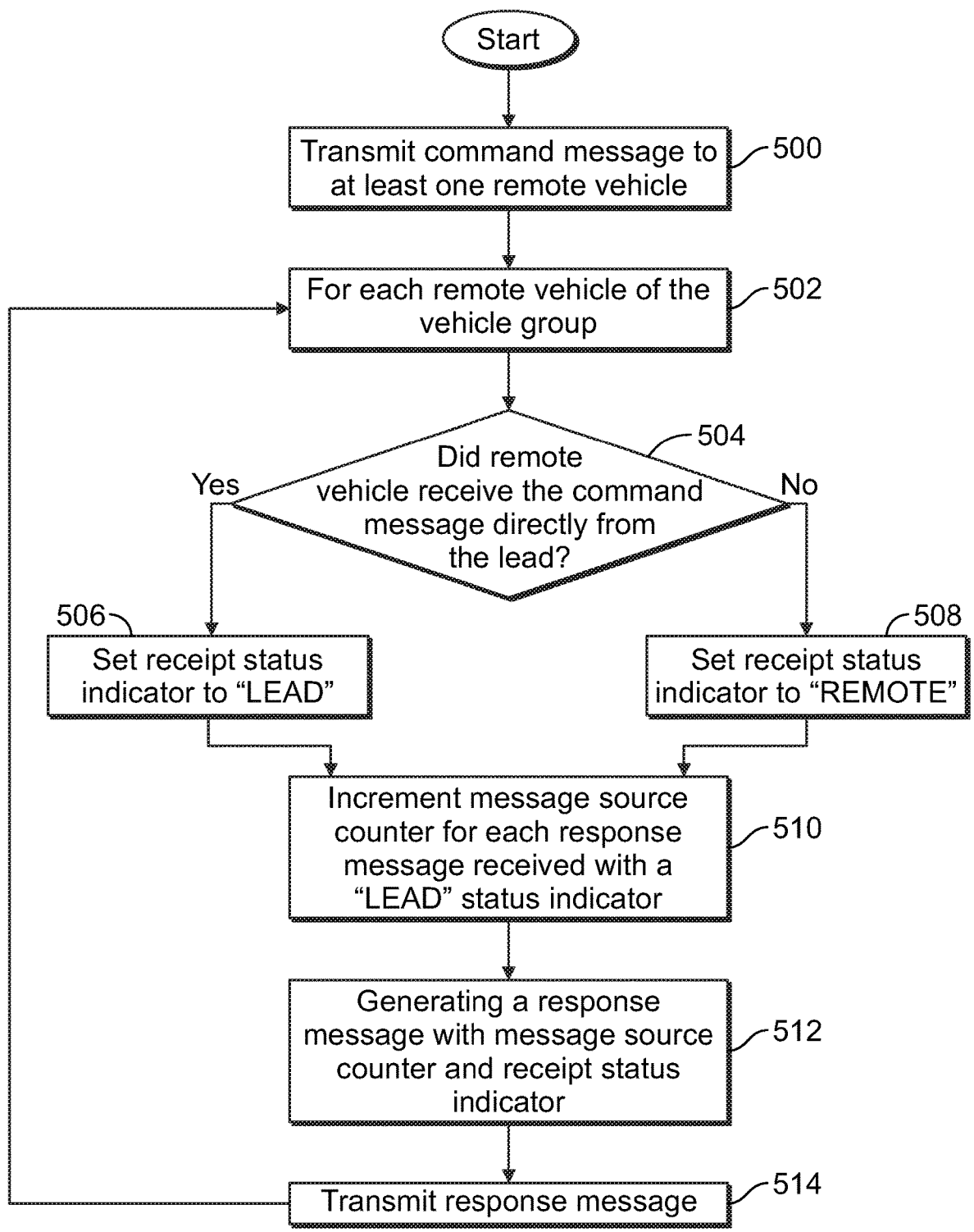
FIG. 9 is a flow diagram for determining a communication status of vehicles in a vehicle group according to the principles of the invention.

Referring now to FIG. 9, a method for determining a communication status of vehicles in a distributed power system is shown according to an embodiment. At a first step 500, a lead vehicle transmits a command message to a plurality of remote vehicles in a vehicle group. The method then proceeds to step 502, in which a process is carried out for each remote vehicle. For each remote vehicle in a consist (i.e., a member of the vehicle group), an on-board system of the remote vehicle determines whether the command message was received directly from the lead vehicle at step 504. This determination may be made by analyzing the data received, including but not limited to a header of a command message, to identify the source of the data. Alternatively, the inverse can be done where the determination is whether the message was received indirectly (e.g., via another non-lead vehicle or a wayside device) as noted below.

With continued reference to FIG. 9, if it is determined that the command message was received directly from the lead vehicle at step 504, the method proceeds to step 506 in which the message source indicator of the remote vehicle is set to a first state (e.g., "LEAD"). If it is determined at step 504 that the command message was not received directly from the lead vehicle, but rather received indirectly, the method proceeds to step 508 in which the message source indicator of the remote vehicle is set to a second state (e.g., "REMOTE"). After the message source indicator is set to either a first or second state, the method proceeds to step 510 in which the message source counter of the remote vehicle is incremented for each response message received from other remote vehicles in which the message source indicator is set to the first state (i.e., for each response message received from a remote vehicle that itself received the command message directly from the lead vehicle). The remote acknowledgement counter of the remote vehicle may be incremented in response to receiving a command message directly or indirectly from the lead vehicle (not shown in FIG. 9). Alternatively, if the message is receive both directly and indirectly an embodiment of the invention may account for that situation as well.

Still referring to FIG. 9, the method proceeds to step 512 in which a response message may be generated by the remote vehicle and includes at least values of the message source counter and the message source indicator. A suitable response message may be generated by the remote vehicle at a determined interval, and/or in response to receiving a message, or the occurrence of some other event. At step 514, the response message is transmitted such that it can be received by a receiver within range and capable of receiving the message. The method then returns to step 502 to repeat steps 504, 506 or 508, 510, 512, and 514 for at least some of the remote vehicles. In one embodiment, each remote vehicle in the vehicle group may perform at least steps 512 and 514 at staggered time intervals, such that each remote vehicle generates and transmits a respective response message at respective times.

As used herein, the terms "communication", "communicatively coupled" and "communicate" refer to the receipt or transfer of one or more signals, messages, commands, or other type of data. For one unit or component to be in communication with another unit or component means that the one unit or component is able to directly or indirectly receive data from and/or transmit data to the other unit or component. This can refer to a direct or indirect connection that may be wired and/or wireless in nature. Additionally, two units or components may be in communication with each other even though the data transmitted may be modified, processed, routed, and the like, between the first and second unit or component. For example, a first unit may be in communication with a second unit even though the first unit passively receives data, and does not actively transmit data to the second unit. As another example, a first unit may be in communication with a second unit if an intermediary unit processes data from one unit and transmits processed data to the second unit.

For purposes of the description, the terms "end", "upper", "lower", "right", "left", "vertical", "horizontal", "top", "bottom", "lateral", "longitudinal", and derivatives thereof shall relate to the invention as it is oriented in the drawing figures. However, embodiments of the invention may assume various alternative variations and step sequences, except where expressly specified to the contrary. The specific devices and processes illustrated in the attached drawings, and described in the following specification, are exemplary embodiments or aspects of the invention. Although the invention has been described in detail for the purpose of illustration based on what may be practical embodiments or aspects, such detail is for that purpose and that the invention is not limited to the disclosed embodiments or aspects. It covers modifications and equivalent arrangements that are within the scope thereof. One or more features of any embodiment or aspect can be combined with one or more features of any other embodiment or aspect.

The invention claimed is:

1. A method comprising:
   transmitting, by a lead communication device of a lead vehicle, a command message;
   receiving, by a plurality of communication devices of a respective plurality of remote vehicles, the command message;
   transmitting, by a communication device of at least one remote vehicle of the plurality of remote vehicles, a status reply message in response to receipt of the command message, wherein at least a portion of the command message is repeated within the status reply message;
   receiving, by a communication device of at least one other remote vehicle of the plurality of remote vehicles, the status reply message including the repeated at least a portion of the command message;
   incrementing, at the at least one other remote vehicle of the plurality of remote vehicles, a current status reply count in response to the receipt of the status reply message including the repeated at least a portion of the command message from the at least one remote vehicle of the plurality of remote vehicles;
   transmitting, by the communication device of the at least one other remote vehicle of the plurality of remote vehicles, an expanded status reply message including the current status reply count to the lead communication device of the lead vehicle;
   receiving, by the lead communication device of the lead vehicle, the expanded status reply message;
   determining, by an on-board processor of the lead vehicle, a communications status of a communication device of the at least one remote vehicle with respect to the command message, based at least partly on the current status reply count in the expanded status reply message received from the at least one other remote vehicle; and
   controlling, by the on-board processor of the lead vehicle, at least one of a throttle and a brake of the at least one remote vehicle based on the communications status of the communication device of the at least one remote vehicle with respect to the command message.

2. A method comprising:
   receiving a command message from a first vehicle at a second vehicle, wherein the first vehicle and second vehicle are communicatively coupled to define at least a portion of a vehicle group;
   receiving a status reply message from the second vehicle at the first vehicle in response to a trigger event, the status reply message including a command received count that represents a number of times that the status reply message has been received from at least one vehicle in the vehicle group other than the first vehicle and the second vehicle, the trigger event including one or more of receipt of the command message, elapse of a determined time period, or a change in an operational state of the second vehicle;
   controlling an operation of one or more vehicles in the vehicle group based at least in part on a communications status of a communication network that includes at least one communication device of each of the first vehicle and the second vehicle, the communications status of the communication network determined based on the command received count;
   determining a location of at least one of the second vehicle or the first vehicle where the command received count is determined.

3. The method according to claim 2, wherein at least a portion of the command message is repeated within the status reply message.

4. The method according to claim 2, further comprising determining the communications status based at least partly on the command received count.

5. The method according to claim 2, further comprising modifying the status reply message to create an expanded status reply, wherein the expanded status reply comprises a first status reply and a second status reply, where each of the first and second status replies is sent from a different vehicle in the vehicle group.

6. The method according to claim 2, further comprising determining the communications status of the communication network.

7. The method according to claim 6, wherein the at least a communication device includes a plurality of communication devices disposed on the first vehicle and the second vehicle, and the communications status of the communication network is determined based at least partly on the command received count received by a communication device onboard the first vehicle.

8. The method according to claim 7, wherein the second vehicle is one of a plurality of remote vehicles of the vehicle group, the method further comprising:
   confirming or logging receipt of the command message by one or more of the remote vehicles based at least in part on a respective status reply message from the one or more of the remote vehicles; and
   controlling, by an on-board controller, at least one of a throttle, brake, steering, yaw, or elevation of one or more vehicles in the vehicle group at least partly in response to the confirmed or logged receipt of the command message.

9. The method according to claim 2, further comprising controlling, via an on-board controller of the first vehicle, at least one of a throttle, brake, steering, yaw, or elevation of at least one other vehicle in the vehicle group.

10. The method according to claim 9, wherein controlling is performed in a less restrictive manner for a determination that a confirmed receipt of the command message by the at least one other vehicle of the vehicle group relative to a determination that the at least one other vehicle has not received the command message.

11. The method according to claim 2, wherein the at least one communication device is a first communication device of a plurality of communication devices, the method further comprising:
   determining that the first communication device has not received a respective status reply message from a second communication device of the plurality of communication devices that is associated with at least one second vehicle; and
   determining a device communications status of the second communication device based at least partly on a status reply count in an expanded status reply message.

12. The method according to claim 11, further comprising delaying, for a determined period of time, designation of the device communications status of the second communication device.

13. The method according to claim 11, further comprising repeatedly generating the status reply message without prompting generation of the status reply message from receipt of the command message.

14. The method according to claim 2, further comprising:
determining whether a first communication device of the second vehicle has received the command message; and
repeatedly communicating the command message from the first vehicle until a controller determines that a second communication device of the second vehicle has received the command message.

15. The method according to claim 2, further comprising switching modes of the first vehicle and the second vehicle such that the second vehicle communicates the command message and the first vehicle receives the command message from the second vehicle, and the first vehicle responds to receipt of the command message by generating and communicating the status reply message to the second vehicle.

16. The method according to claim 2, further comprising:
determining, by an on-board processor of the first vehicle, whether communication devices of the second vehicle and at least a third vehicle in the vehicle group have not received the command message; and
generating or providing, by the on-board processor of the first vehicle, an output to an operator of the first vehicle indicating at least one of: i) receipt of the command message by each of the communication devices of the second vehicle and the at least a third vehicle is confirmed or ii) receipt of the command message by one or more of the communication devices cannot be confirmed.

17. The method according to claim 2, further comprising determining whether the command message that is received is a new command message or a previously received command message.

18. A system, comprising:
a first onboard computer configured to receive a command message from a first vehicle at a second vehicle, wherein the first vehicle and second vehicle are communicatively coupled to define at least a portion of a vehicle group;

a second onboard computer configured to receive a status reply message from the second vehicle at the first vehicle in response to a trigger event, the status reply message including a command received count that represents a number of times that the status reply message has been received from at least one vehicle in the vehicle group other than the first vehicle and the second vehicle, the trigger event including one or more of receipt of the command message, elapse of a determined time period, or a change in an operational state of the second vehicle, and at least one of the first and second onboard computers configured to operate one or more vehicles in the vehicle group based at least in part on a determined communications status of a communication network comprising at least one communication device with respect to the command message and the status reply message, the communications status determined based on the command received count;

determining a location of at least one of the second vehicle or the first vehicle where the command received count is determined.

* * * * *